United States Patent [19]

Palmer et al.

[11] 3,754,661
[45] Aug. 28, 1973

[54] APPARATUS FOR CLARIFYING LIQUID
[75] Inventors: Warren G. Palmer, Saratoga, Calif.; Roger Davidson, Arlington Heights, Ill.
[73] Assignee: FMC Corporation, San Jose, Calif.
[22] Filed: Apr. 15, 1971
[21] Appl. No.: 134,334

[52] U.S. Cl................. 210/386, 210/401, 210/408, 210/526
[51] Int. Cl............................................ B01d 35/20
[58] Field of Search.................... 210/79, 386, 389, 210/401, 408, 526

[56] References Cited
UNITED STATES PATENTS

| | | | |
|---|---|---|---|
| 3,575,850 | 4/1971 | Davidson et al. | 210/526 |
| 949,724 | 2/1910 | Bebbington | 210/396 X |
| 3,447,451 | 6/1969 | Meskanen | 210/386 X |
| 2,860,973 | 11/1958 | Wells | 210/396 X |
| 1,304,253 | 5/1919 | Bird | 210/396 X |
| 2,949,187 | 8/1960 | Owens | 210/386 X |
| 2,294,179 | 8/1942 | Hawley | 210/396 X |
| 3,489,679 | 1/1970 | Davidson et al. | 210/77 X |

Primary Examiner—Samih N. Zaharna
Assistant Examiner—F. F. Calvetti
Attorney—Dressler, Goldsmith, Clement & Gordon

[57] ABSTRACT

The effectiveness of a liquid clarifier having two liquid filled compartments, the first for depositing solids suspended in an incoming liquid solution on a continuous screen and the second for removing the solids from the same continuous screen, is optimized by preventing carry-over of water via the screen from the first compartment to the second by squeezing, wiping, drawing, or blowing the water off the screen as it emerges from the first compartment and by preventing carry-back of the solids from the second compartment to the first by spraying, wiping, blowing, or brushing the solids off the screen as it emerges from the second compartment.

10 Claims, 15 Drawing Figures

Patented Aug. 28, 1973
3,754,661
5 Sheets-Sheet 1
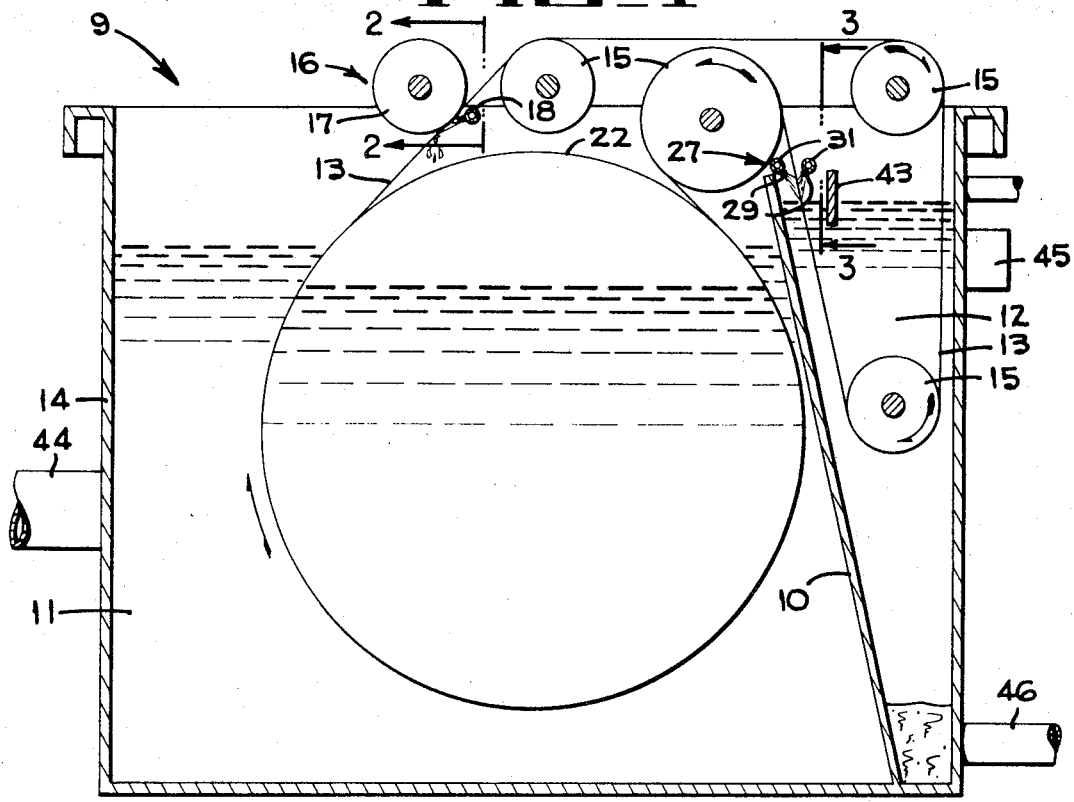
FIG_1
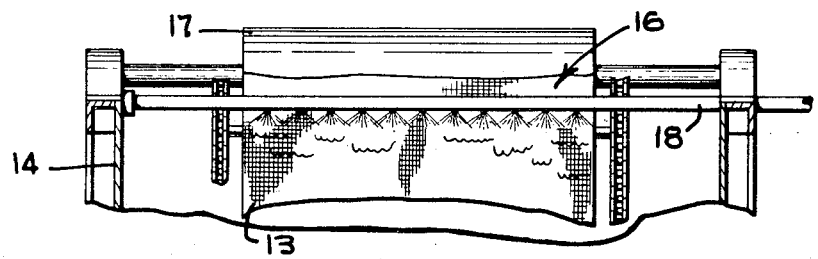
FIG_2
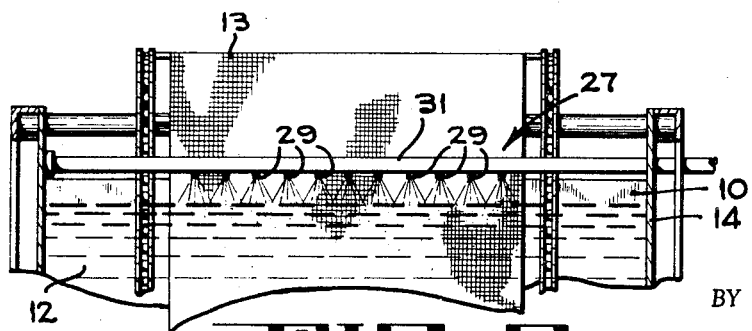
FIG_3
INVENTORS
WARREN G. PALMER
ROGER DAVIDSON
BY *Dressler, Goldsmith,*
*Clement & Gordon*
ATTORNEYS Patented Aug. 28, 1973
3,754,661
5 Sheets-Sheet 2
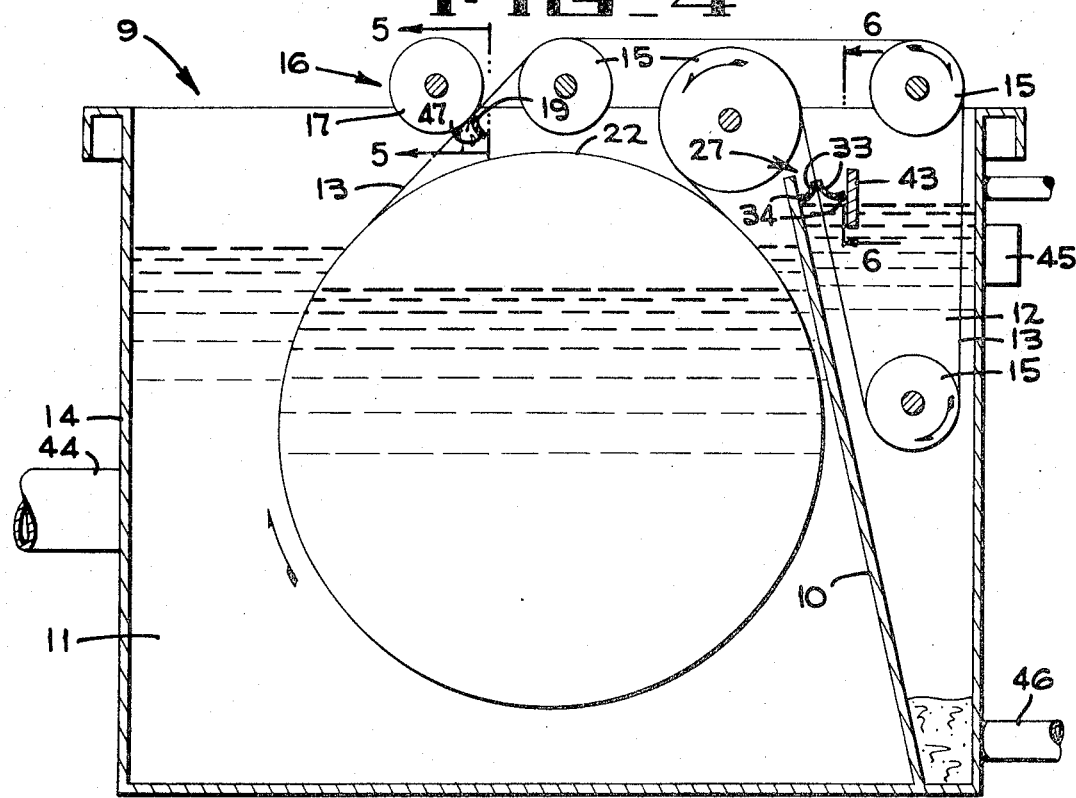
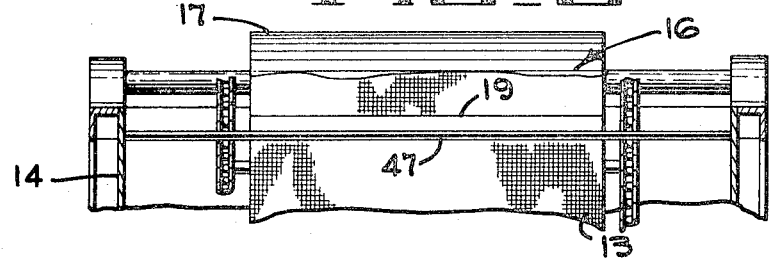
INVENTORS
WARREN G. PALMER
ROGER DAVIDSON
BY Dressler, Goldsmith,
Clement & Gordon
ATTORNEYS

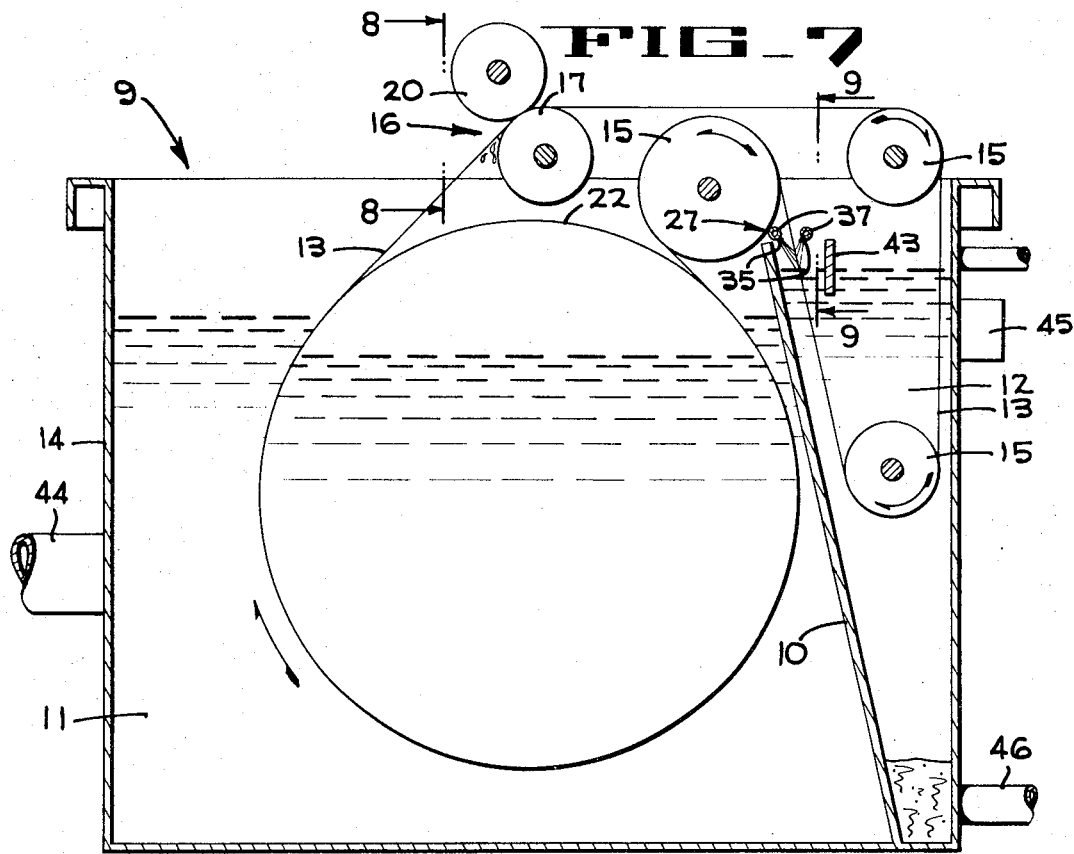
FIG_7
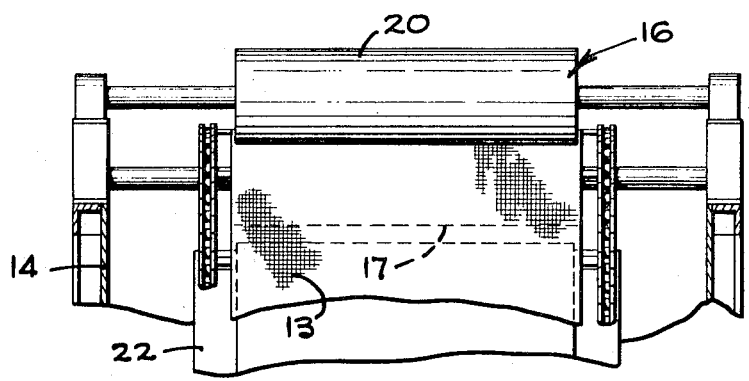
FIG_8
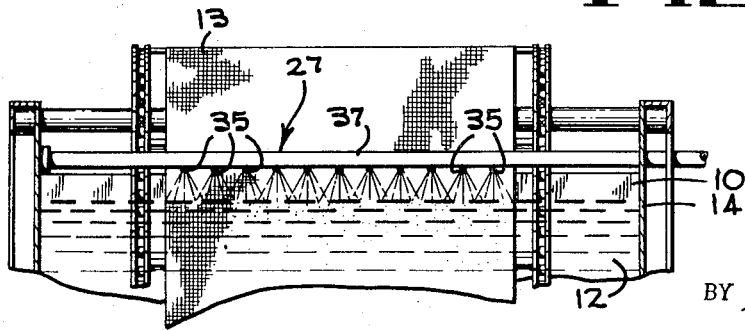
FIG_9
INVENTORS
WARREN G. PALMER
ROGER DAVIDSON
BY Dressler, Goldsmith,
Clement & Gordon
ATTORNEYS Patented Aug. 28, 1973
3,754,661
5 Sheets-Sheet 4
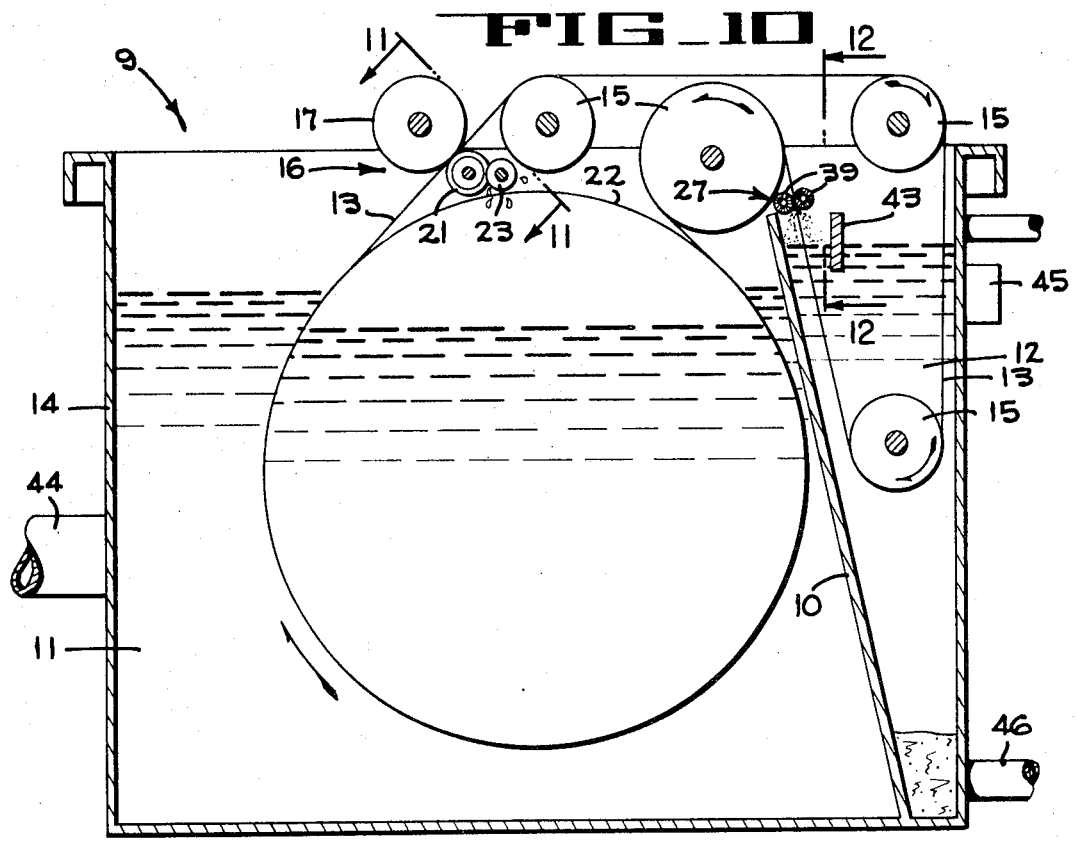
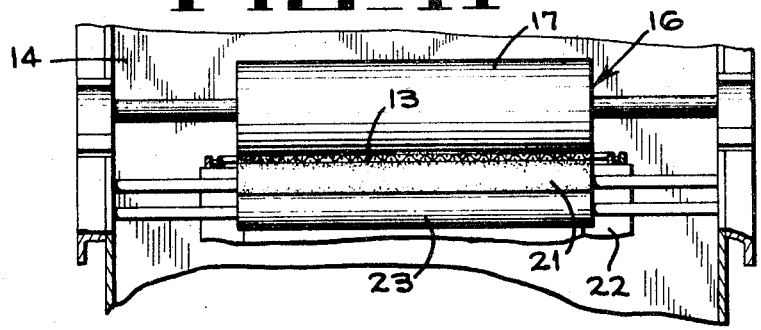
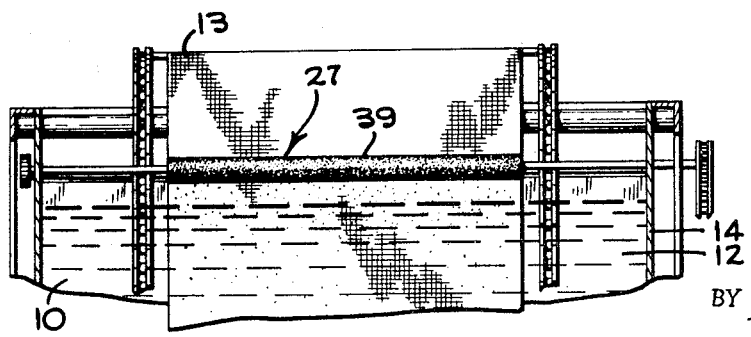
INVENTORS
WARREN G. PALMER
ROGER DAVIDSON
BY Dressler, Goldsmith,
Clement, & Gordon
ATTORNEYS

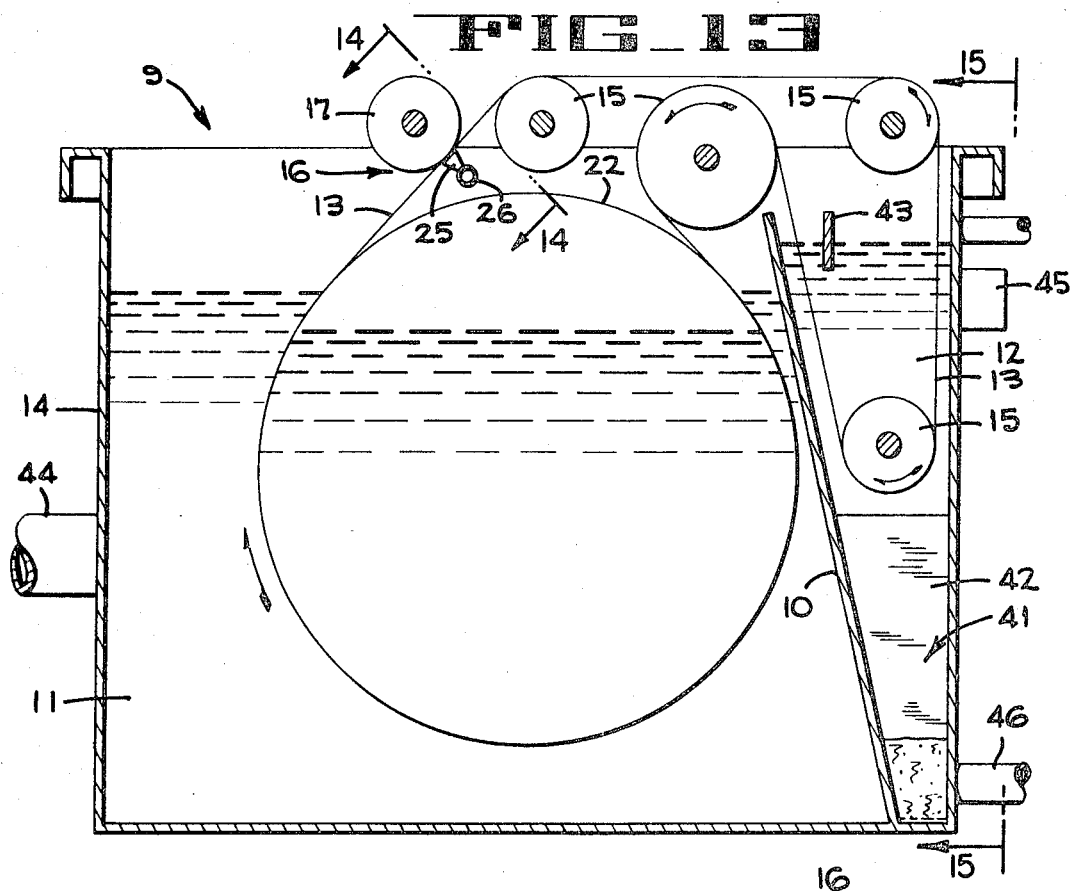
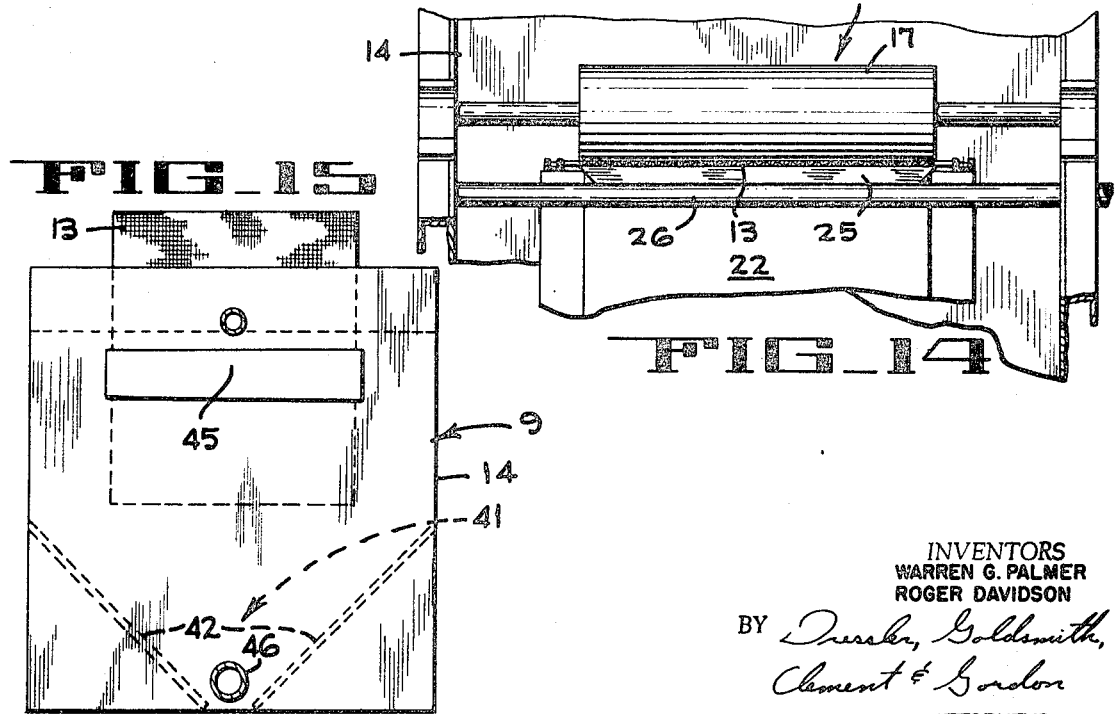

APPARATUS FOR CLARIFYING LIQUID

BACKGROUND OF THE INVENTION

This invention relates generally to the removal of matter from a moving screen, but relates more particularly to the removal of liquid from solids deposited on a moving screen and the subsequent removal of the solids from the screen in a clarifying apparatus such as the one disclosed in U.S. Pat. No. 3,489,679, which is of common ownership with the present application.

The apparatus with which the present invention is adapted to cooperate finds particular application in the clarification of liquids containing minute particles of suspended solids including organic materials which are normally difficult to remove from the host liquid. An example of a host liquid would be sewage. The apparatus typically has a continuous screen which circulates through a main compartment where solids from an incoming effluent are deposited thereon. After solid deposition, the continuous screen emerges from the effluent in the main compartment and circulates through a second compartment where the solids are removed. Following removal of the solids in the second compartment, the screen emerges therefrom and returns to the main compartment to begin a new cycle. The apparatus in its basic form, without the aid of the present invention, may not operate at optimum potential because the screen as it emerges from the main compartment tends to pick up water, in addition to the desired solid pickup, and deposits the water in the second compartment. Also, as the screen emerges from the second compartment, it tends to drag some of the solids which were to be deposited in the second compartment back into the main compartment, cutting down the effectiveness and efficiency of the apparatus.

SUMMARY OF THE INVENTION

The present invention is primarily used to optimize the effectiveness of an apparatus designed to remove liquid suspended solids from a liquid solution wherein the solids are deposited on a continuous screen in one liquid filled compartment, transferred by the screen to a second liquid filled compartment, and then removed from the screen in the second liquid filled compartment.

An object of the apparatus is to separate the solids from the liquid in the first compartment, which solids are then collected in the second compartment. Therefore, the effectiveness of the apparatus is improved if the liquid from the first compartment is prevented from being transferred to the second compartment where the solids are to be concentrated. Some provision may be made for preventing the carry-over of liquid, since as the screen emerges from the first liquid filled compartment where the solids were deposited on the screen, quantities of the liquid are carried with the solids.

In accordance with the present invention, excess liquid is returned to the first compartment and thus prevented from being transferred to the second compartment while not deterring the transfer of solids between the first and second compartments. This can be accomplished in various ways, including the placing of a backup roller against the screen on the side where the solids have been collected to retain them on the screen, while removing the excess liquid from the opposite or clean side of the screen as it emerges from the first compartment. Removal of excess liquid is achieved by squeezing the liquid off the screen with a second roller, wiping it off with a sponge or wick, drawing it off with a vacuum head, blowing it off with air jets, or soaking it up with a sponge roller. This procedure very effectively removes the excess liquid from the screen and, at the same time, insures the adherence of the solids to the screen for transfer to the second compartment.

After the removal of liquid by one of the various ways discussed above, the solid bearing screen is submerged in a second compartment or cleaning compartment for the removal of the solids. Since it is a primary object of the clarifying apparatus to concentrate solids in the cleaning compartment, it is important to the effective operation of the apparatus that all of the solids carried by the screen be removed and deposited in the cleaning compartment and the screen itself be cleaned. To this end, the solids are removed in the second compartment by some apparatus, such as by an ultrasonic transducer. Also, to assure that the screen is clean before it re-enters the main chamber, various screen cleaning devices may be employed immediately above the liquid of the cleaning compartment in the path of the screen after it leaves the cleaning compartment. These could include a set of spray nozzles placed on both sides of the screen to wash the solids off, wipers placed on both sides of the screen to wipe the solids off, air jets placed on both sides to blow the solids off, or soft counterrotating brushes placed on both sides of the screen to brush the solids off.

The manner by which the advantages of the invention may be attained will be apparent from the accompanying drawings and a detailed description of the invention which follows.

BRIEF DESCRIPTION OF THE DRAWINGS

FIG. 1 is a vertical diagrammatic section of an apparatus for clarifying the liquids with several embodiments of the present invention being a part thereof;

FIG. 2 is a sectional view taken on line 2—2 of FIG. 1;

FIG. 3 is a sectional view taken on line 3—3 of FIG. 1;

FIG. 4 is a vertical diagrammatic section of an apparatus for clarifying liquids illustrating other embodiments of the present invention;

FIG. 5 is a sectional view taken on line 5—5 of FIG. 4;

FIG. 6 is a sectional view taken on line 6—6 of FIG. 4;

FIG. 7 is a vertical diagrammatic section of an apparatus for clarifying liquids illustrating still other embodiments of the present invention;

FIG. 8 is a sectional view taken on line 8—8 of FIG. 7;

FIG. 9 is a sectional view taken on line 9—9 of FIG. 7;

FIG. 10 is a diagrammatic vertical section of an apparatus for clarifying liquids illustrating still other embodiments of the present invention;

FIG. 11 is a sectional view taken on line 11—11 of FIG. 10;

FIG. 12 is a sectional view taken on line 12—12 of FIG. 10;

FIG. 13 is a diagrammatic vertical section of an apparatus for clarifying liquids illustrating still other embodiments of the present invention;

FIG. 14 is a sectional view taken on line 14—14 of FIG. 13; and

FIG. 15 is an elevational view, taken looking in the direction of arrow 15—15 of FIG. 13, showing in dotted lines the bottom configuration of the screen cleaning compartment.

DESCRIPTION OF PREFERRED EMBODIMENT

This invention will be described in detail in connection with a liquid clarifying apparatus generally designated 9 because it is with an apparatus of this type that the invention is particularly useful.

The liquid clarifier 9 is comprised of a tank 14 divided into two liquid compartments by a partition wall 10. The tank includes a main compartment 11, where liquid suspended solids are received through an inlet 44 and in which a movable endless screen 13 is located, which screen filters out the solids from the effluent passing therethrough. Located on the other side of the wall 10 is a screen cleaning or concentrating compartment 12 where the solids deposited on the screen are removed therefrom.

As shown in FIG. 1, the screen 13 is directed around a drum 22 and a series of idler pulleys 15. It is in the area where the screen is directed around the drum that solids suspended in an incoming solution are deposited on the screen. It will be seen that the idler pulleys 15 are so located that the screen moves out of the compartment 11 over the partition wall 10, through the liquid containing portion of the compartment 12, back into compartment 11, and around the drum 22. Due to the differences in liquid levels maintained between the exterior and interior parts of the drum, the effluent received in the main compartment 11 through the inlet 44 is filtered by the screen 13 and the clarified liquid moves into the interior of the drum and flows out therefrom through a conduit (not shown).

A suitable material for the screen 13 is a filter cloth or woven fabric, such as a Polyester monofilament cloth with a nominal hole size of about 20 microns. The screen is power-driven by motor means, which are not shown, but which can be of any conventional design, such as that illustrated in U.S. Pat. No. 3,489,679. The screen transfers the solids deposited thereon out of the main compartment 11 into the concentrating compartment 12, where the solids are removed and the screen cleaned, preferably by an ultrasonic transducer 45, one type of which is described in detail in the aforementioned U.S. Pat. No. 3,489,679. After the screen is cleaned in the concentrating compartment 12, it is then returned to the main compartment 11, where it will again function to filter the solids out of the effluent contained therein.

In accordance with the present invention, there are various means located immediately above the liquid level in the main compartment 11 for removing and returning into compratment 11 excess liquid which has clung to the screen or is contained in the solids deposited on the screen and being carried out of compartment 11 into compartment 12, where they are to be removed. It is desirable to return any such excess liquid to compartment 11, so that the liquid is retained in the main compartment and not carried over into the concentrating compartment. The several means that are employed for removing the excess liquid are designated by the numeral 16 in the various views in the drawings and they will be discussed in detail below.

As can be seen in FIGS. 1 and 2, liquid removal means 16 in one embodiment comprises a cylindrical roller element 17 having a relatively hard outer surface and extending across the entire width of screen 13. The roller 17 is disposed in pressing contact with the screen against the side of the screen on which solid matter is deposited. On the opposite side of the screen 13, there is located a set of air-jet nozzles which may take the form of orifices in a header 18, which nozzles are disposed to direct streams of air against the relatively clean side of the screen in a direction generally opposite to the movement of the screen 13 which is indicated by arrows in FIG. 1. The roller 17 acts to hold the deposited solid matter against the screen while the air jets blow excess liquid, which has clung to the screen, off the screen and back into main compartment 11.

Modified embodiments of various means 16 that can be used to remove liquid that has adhered to the screen or is retained by the solids are shown in FIGS. 4, 7, 10 and 12. As can be seen, all of the illustrated embodiments employ a roller member 17 identical with that shown in the embodiment of FIGS. 1 and 2. While this roller element has been used in several of the embodiments for holding the solids against the screen while some other element removes the excess liquid, the invention is clearly not restricted to the use of such a roller.

In the embodiment illustrated in FIGS. 4 and 5, the means for removing the liquid is shown to be a wiper 19 which simply acts to wipe excess liquid off the screen. This wiper 19 can be a squeegee, wick, sponge, or any other element suitable for wiping liquid off a mesh surface. The wiper 19 is mounted on a transverse bar 47 (see FIG. 6) located on the opposite side of the screen from roller 17. The roller 17 is in pressing relationship with the screen, and is located directly opposite to the roller 17 to remove liquid from the screen vhile the roller prevents deposited solids from being removed.

The embodiment of the liquid remover means shown in FIGS. 7 and 8 comprises two roller members. Roller member 17 in this embodiment is placed on the clean side of screen 13 and a second roller member 20 similar to roller member 17 but having a softer outer surface is placed on the solid bearing side for retention of the solids. The two roller members, one on either side of the screen, press in direct opposition to each other thereby squeezing the excess liquid out of the screen while leaving the solids attached.

Another embodiment of a liquid remover means is shown in FIGS. 10 and 11. Here roller 17 is again disposed to press against the solid bearing side of screen 13 while directly opposed to roller 17 on the opposite or clean side of the screen is a sponge-coated roller 21 having a relatively hard core. Sponge roller 21 presses against the screen and absorbs liquid off the screen. In order to free sponge roller 21 of the liquid it absorbs, a third roller 23 is placed in slightly overlapping relationship therewith, to squeeze liquid from the sponge portion and cause it to drain back into the main compartment. The spacing between the parallel rotational axes of rollers 21 and 23 is less than the sum of their respective radii, but not so much less that roller 23 could ever come into contact with the hard core of roller 21. Roller 23 is also placed so as not to interfere with the cooperative squeezing of rollers 17 and 21.

Another embodiment of a liquid removing means is illustrated in FIGS. 13 and 14. In this embodiment, a roller 17 is again placed in pressing contact against the solids bearing side of screen 13. A vacuum head 25, connected to a suitable vacuum header 26, is disposed on the opposite or clean side of screen 13 directly opposite the place at which roller 17 presses against the screen. This vacuum head 25 acts to draw excess liquid off the screen while roller 17 is holding the deposited solids on the screen for transfer to compartment 12.

After the excess liquid has been removed from screen 13, the screen is directed into concentration compartment 12 with the solid matter still attached. The purpose of concentrating compartment 12 is to remove this solid matter and prevent it from redepositing itself on the screen. Preferably the solids are removed from the screen by an ultrasonic transducer; but other suitable removal means can be used. It is a common occurrence that not all of the solids get removed from the screen or that some of the solids that do get removed re-attach themselves to the screen before it leaves the concentrating compartment.

As stated above, one objective of the clarifying apparatus is to separate the suspended solids in compartment 11 from the liquid in that compartment. Another objective is the concentration of solids in concentrating compartment 12. Therefore, it is important that none of the solids which have been carried on the screen from compartment 11 to compartment 12 be carried back into compartment 11. To prevent this carry-back, which would considerably reduce the effectiveness and efficiency of the clarifying apparatus, solid removal means 27 are provided immediately above the liquid level of the concentrating compartment 12.

FIGS. 1 and 3 show one preferred embodiment of solid removal means 27 which is located above the liquid in compartment 12. It is comprised of two sets of air jets 29 flowing from pressurized headers 31 and disposed, one set on either side of screen 13, so that the air streams are directed to oppose the movement of the screen which is indicated by arrows in FIG. 1. As can be seen in FIG. 3, the air jets extend across the entire width of screen 13 and serve to blow solids off the screen and back into concentrating compartment 12. The jets contact the screen after the screen leaves compartment 12 and just prior to it re-entering compartment 11.

Another embodiment of solid removal means 27 is illustrated in FIGS. 4 and 6. In this embodiment, a pair of wipers 33 are mounted on transverse bars 34 located on both sides of screen 13. The wipers 33 press against screen 13 and wipe off any solids that are attached thereto. These wipers are preferably made of rubber, but any material suitable for wiping solid particles off a mesh surface could be used.

FIGS. 7 and 9 illustrate another means for removing solid matter from a moving screen. These consist of two sets of nozzles 35 connected to water supply conduits 37 and adapted to deliver a spray of water in a direction opposite to the movement of the screen 13. The water spray washes the solid particles off the screen and back into compartment 12. The water supply conduits are of course connected to water pump means, which are not shown, to supply the proper amount of water at the desired pressure.

Another embodiment of apparatus for removing solids from a moving screen is illustrated in FIGS. 10 and 12. In this embodiment, two soft counter-rotating cylindrical brushes 39, driven by motor means, not shown, are mounted from sidewalls of the tank, one on either side Of screen 13, so as to brush solids off the screen and back into compartment 12.

The prevention of the re-attachment of solids to screen 13 after they have been removed therefrom can be aided by encouraging a rapid descent of the solids as they are removed from the screen. A rapid descent helps to prevent re-attachment because, as can be seen in FIGS. 1, 4, 7, 10, and 13, the screen is only submerged in the upper portion of compartment 12, and if the removed solid particles are encouraged to descend rapidly, they move away from the upper portion of the compartment, thus decreasing the possibility of re-attachment. Providing concentration compartment 12 with a hopper bottom 41 defined by inclined sidewalls 42, partition wall 10, and an end wall of the tank, as shown in FIG. 15, is a preferred way to encourage solid descent and compaction in the gravity settling compartment.

Another way of preventing the re-attachment of the solids in compartment 12 to the screen is to place a partially submerged wall or baffel 43 in close proximity to the screen at the point where it emerges from the liquid to prevent the lighter solids, which have floated to the surface, from coming into contact with the screen.

In operation, a liquid having solids suspended therein flows through input conduit 44 into the main compartment 11 of the liquid clarifier 10. The endless movable screen 13 circulates through the main compartment 11 and solids which are suspended in the incoming liquid collect on one surface of the screen. The screen is moved out of the liquid in the main compartment 11 by motor means and it passes through a liquid removing means 16 which absorbs, wipes, blows, draws, or squeezes the excess liquid from the solids and off the screen and drains it back into the liquid in the main compartment 11. The removal of the liquid is accomplished without disturbing the solids which were collected on the screen. The screen then moves into the concentrating or cleaning compartment 12 where most of the solids are removed ultrasonically and encouraged to concentrate in the hopper bottom of compartment 12. As screen 13 emerges from the compartment 12, it passes through solid removal means 27 where any solids which remain on the screen, or have re-attached, are washed, wiped, blown, or brushed off the screen and back into compartment 12, where they drop to the hopper bottom of the compartment to be removed from the clarifying apparatus through conduit 46. The screen 13 then returns to main compartment 11 free of any attached solids to begin an identical cycle.

Although various modes for carrying out the present invention have been herein shown and described, it will be apparent that modification and variation may be made without departing from what is regarded to be the subject matter of the invention.

What is claimed is:

1. Apparatus for clarifying a liquid suspension of solids comprising a main liquid containing compartment having an inlet for unclarified liquid suspension and an outlet for clarified liquid, and a liquid containing auxiliary compartment; an endless screen in said main compartment for filtering out suspended solids in said liquid suspension as the liquid flows between said inlet and outlet, which screen extends through the liquids contained in both compartments; means for moving said screen for the transfer of screened solids from the main to the auxiliary compartment; first means located above the liquid in said main compartment for removing liquid carried by the screen and solids on the screen out of the main compartment while retaining the solids on said screen; second means for cleaning said screen as it enters said auxiliary compartment; and third means for cleaning said screen after it leaves said auxiliary compartment to insure that no solids will be carried back into said main compartment.

2. The apparatus of claim 1 wherein said first means comprises a first roller member contacting said screen, a second roller member contacting the screen on the opposite side thereof and at a position which is directly opposed to the first roller so as to squeeze the screen between the first and second rollers, thereby acting to force the excess liquid off the screen and back into the main compartment.

3. The apparatus of claim 1, wherein the first means comprises roller and wiper members acting in pressing relationship on opposite sides of the screen, with the roller member being disposed on the side where the solids have been collected to wipe excess liquid off the screen, which then drops back into the main compartment.

4. The apparatus of claim 1, wherein the first means comprises a roller member contacting the screen member on the side where the solids have been collected and a vacuum head member directly opposing the roller member on the opposite side of the screen to draw excess liquid off the screen.

5. The apparatus of claim 1 wherein said first means comprises a roller member contacting the screen and air jet means, said air jet means being disposed on the opposite side of the screen from the roller member so as to direct streams of air against the motion of the belt directly opposite to where the roller member contacts the screen so as to blow excess liquid off the screen and back into the main compartment.

6. The apparatus of claim 1 wherein said first means comprises a first roller member contacting the screen, a second hard cored resilient surfaced roller member disposed on the opposite side of the screen in contact with the screen member and directly opposing the first roller to squeeze the screen between said first and second roller member and absorb the excess water off the screen, and a third roller member disposed in a pressing relationship to the second roller member so as not to interfere with the squeezing action of the first and second roller members but so as to squeeze the liquid out of the second roller and cause the liquid to drop back into the main compartment.

7. The apparatus of claim 1, wherein said third means comprises a set of nozzles disposed on opposite sides of the screen, through which a liquid can be sprayed to wash any solids remaining on the screen back into the auxiliary compartment.

8. The apparatus of claim 1, wherein said third means comprises wiper means disposed on opposite sides of the screen in pressing contact therewith to wipe any solids remaining on the screen back into the auxiliary compartment.

9. The apparatus of claim 1, wherein the third means comprises air jet means disposed on opposite sides of the screen to blow solids remaining on the screen off the screen and back into the auxiliary compartment.

10. The apparatus of claim 1, wherein said third means comprises soft counter-rotating brushes disposed on opposite sides of the screen in contact therewith to brush solids remaining on the screen back into the auxiliary compartment.

* * * * *